Oct. 9, 1923.
A. S. HOLMES
1,470,265
WORKHOLDING ATTACHMENT FOR MILLING MACHINES
Filed June 18, 1921   2 Sheets-Sheet 1
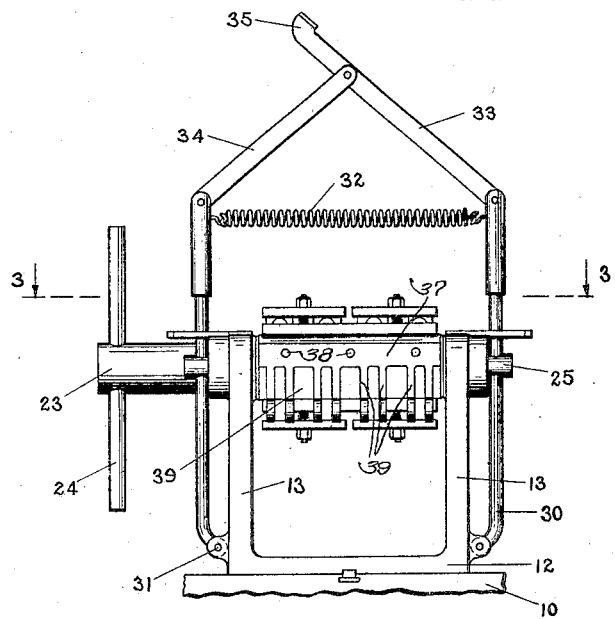
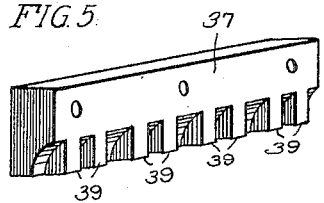
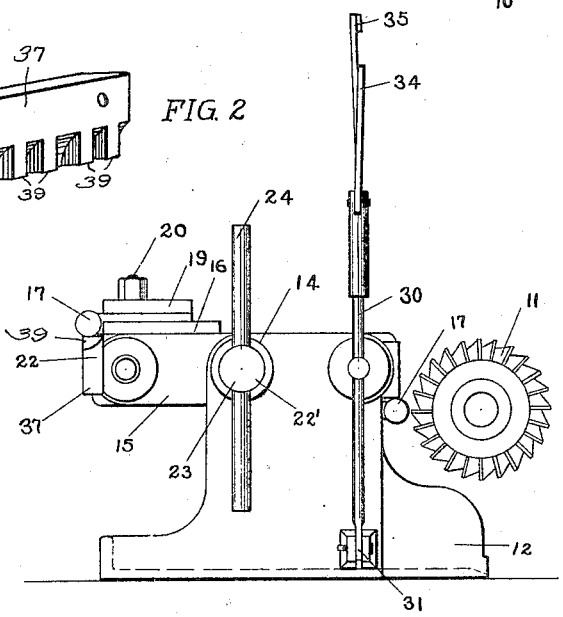
Inventor.
Arthur S. Holmes.
By Morsell & Keeney
Attorneys.

Oct. 9, 1923.

A. S. HOLMES 1,470,265

WORKHOLDING ATTACHMENT FOR MILLING MACHINES

Filed June 18, 1921  2 Sheets-Sheet 2

Inventor.
Arthur S. Holmes.
By Morsell + Keeney,
Attorneys.

Patented Oct. 9, 1923.

1,470,265.

UNITED STATES PATENT OFFICE.

ARTHUR S. HOLMES, OF OSHKOSH, WISCONSIN.

WORKHOLDING ATTACHMENT FOR MILLING MACHINES.

Application filed June 13, 1921. Serial No. 478,613.

*To all whom it may concern:*

Be it known that I, ARTHUR S. HOLMES, a citizen of the United States, and resident of Oshkosh, in the county of Winnebago and State of Wisconsin, have invented new and useful Improvements in Workholding Attachments for Milling Machines, of which the following is a description, reference being had to the accompanying drawings, which are a part of this specification.

This invention relates to work holding attachments for milling machines, and the like, and particularly to an attachment for holding a plurality of pieces of work and carrying them successively into position for operation.

One of the objects of the invention is to provide an improved and simplified attachment of this character whereby the production of a given machine may be increased over that possible with attachments heretofore used.

A further object of the invention is to provide an attachment in which the machining of a piece of work is not rendered imperfect by wear in the attachment.

In attachments of this type, heretofore used, the member holding the pieces of work is made to rotate in a horizontal plane in carrying the work to and from the milling cutter, or other tool. In devices of this character, the wearing of the bolts, or other devices employed to position the piece in operative relation to the milling cutter, caused imperfections in the work because of the play permitted in the device. Such devices also were somewhat slow in operation by reason of the fact that it was necessary to permit the bed of the milling machine to travel back a somewhat greater distance than with the present device, in order to clear the cutter and to bring a new piece into position. A further object of the invention is to provide a novel and improved attachment of this type which rotates in a vertical plane in carrying a succeeding piece of work to the operative position.

The invention consists in the novel constructions, combinations and arrangements, to be hereinafter described and claimed, for carrying out the above stated objects, and such other objects as will appear from the following description of a preferred embodiment illustrated in the accompanying drawings, in which—

Fig. 1 is an end elevation of the attachment or fixture;

Fig. 2 is a side elevation of the device, showing its relation to a milling cutter;

Fig. 5 is a fragmentary detail perspective view.

Like characters of reference designate like parts in the several figures of the drawing.

Figure 3:
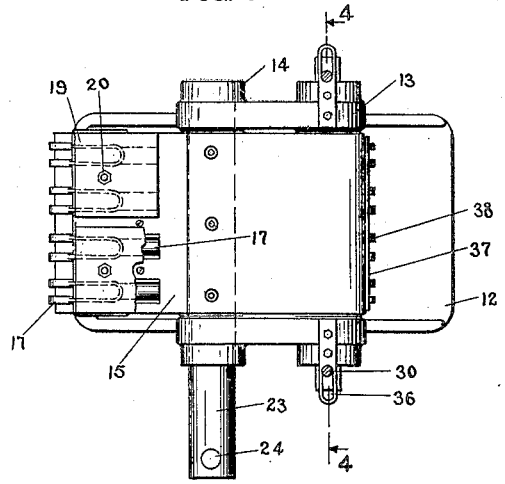
Fig. 3 is a plan view, taken along the line 3—3 of Fig. 1.
Figure 4:
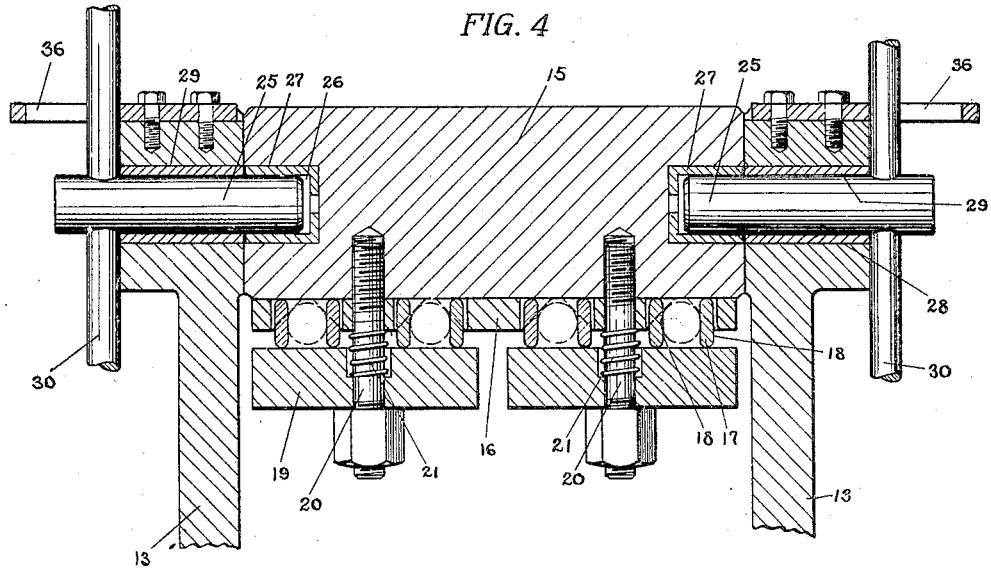
Fig. 4 is an enlarged fragmentary section taken along the line 4—4 of Fig. 3

Referring now to the drawings: 10 designates the bed of a milling machine, (not shown) which may be of any usual type of horizontal miller. These machines are provided with a rotating cutter or cutters 11, the particular style depending upon the character of milling desired; and upon the work to be milled. The base 12 of the attachment or fixture is adapted to be suitably bolted or fastened to the bed of the miller in proper position. This base is provided with side members 13 having bearings 14. Between the side members, and supported in the bearings 14 is a rotary work holding member 15, which is generally flat in character, and provided with means for holding jigs 16 for positioning the work in proper alignment with the cutter or cutters 11. It should be noted that the jigs are adapted to be positioned on opposite faces of the member 15 and near the opposite ends thereof. For the purpose of illustration, the attachment is shown as arranged to hold yoke ends 17 in the jigs. These yokes are straddle-milled on the opposite faces 18 of the yokes. For this purpose suitable milling cutters are positioned on the mandrel of the machine, so as to mill these ends the proper thickness and the proper distance apart. Each jig is adapted to hold four yoke ends, as shown. These pieces of work are clamped in place by plates 19 bolted down by bolts 20. The bolts 20 are provided with springs 21 adapted to raise the plates 19 from the work and the work holder 15, when the bolts are slackened, to permit the removal of the finished work and the positioning of new work in place. After this the bolts may be tightened and the work clamped in place, the jigs 16 serving to accurately align the work with respect to the milling cutters 11. The work is removed and replaced from the end 22 of the attachment. It should be noted that the pieces of work 17 are equi-distant from the axis 22' about which the work holder rotates.

For the purpose of rotating the work holder 15, the shaft 23 supporting the work holder is provided with handles 24 adapted to be grasped by the hand.

For the purpose of holding the work holder in accurate position relative to the milling cutter, bolts 25 are provided for entering the recesses 26 near the opposite ends of the work holder 15. Hardened steel bushings 27 are preferably placed in these recesses to reduce wear. The openings 28 in the side members 13 through which the bolts pass are also preferably bushed with hard metal bushings 29 for the same purpose. Levers 30, pivoted at 31 to the base of the machine, are provided for withdrawing and inserting the bolts into the recesses. These levers pass through openings near the ends of the bolts 25 which are sufficiently large to permit the slight amount of play required by the change in angular relation between the bolts and levers when the bolts are withdrawn or inserted in the recesses. The upper ends of the levers are connected by a tension spring 32, and also provided with toggle arms 33 and 34, by means of which the levers may be separated. One lever, 33, is provided with a hand piece 35 by means of which it may be depressed. When the toggle arms 33 and 34 are depressed, the bolts 25 are withdrawn, and the work holder may be rotated, as above pointed out. If desired, the lengths of the toggle arms 33 and 34 may be so designed that they may be depressed slightly below horizontal position, so as to hold the bolts out of the recesses without further attention. This arrangement is not necessary, however, because in practice the bolts are only momentarily withdrawn until the feeding piece is moved into position, the spring 32 then draws the levers inwardly and forces the bolts into the recesses. Preferably slotted members 36 are provided to limit the outward travel of the levers and bolts.

The operation of the device is apparent from the foregoing description. Fresh pieces of work are inserted in the work holder at the end 22 while the other piece of work is being machined. It is only necessary to permit the bed of the milling machine to travel back until the milling cutter has cleared the piece of work, before bringing a new piece of work into position. Any wear in the bolts or bushings 27 and 29, does not affect the accuracy of the machining, because such wear permits lost motion only in a vertical direction and not laterally relative to the cutter. This does not have any effect on the dimensions to which the pieces are machined. For machining different kinds of work, suitable changes are made in the jigs and the manner of holding the work, and, of course, in the arrangement of milling cutters on the milling machine. For handling work of the character of that illustrated, it is desirable to secure a supporting member 37 at the ends of the workholder 15 by means of bolts 38 or otherwise. This supporting member is provided with projecting ribs 39 intended to support the individual ears of the yoke members 17, which prevent deflection of the pieces of work under a heavy cut or under fast cutter speed. This support, of course, is adapted to be replaced by different kinds of supports for different classes of work.

I claim:

1. A work holding attachment for milling machines and the like comprising in combination a base adapted to be secured to the bed of the machine, a work holder mounted on said base to swing vertically and provided with a plurality of work holding means arranged equi-distantly from the axis of said work holder, and releasable bolts for engaging said holder and holding the same so as to present a piece of work in operative position.

2. A work holding attachment for milling machines and the like comprising in combination a base adapted to be secured to the bed of the machine, a rotary work holder mounted on a horizontal axis on said base and provided with a plurality of work holding means, a plurality of slidable bolts on opposite sides of said base and adapted to enter corresponding recesses in said holder to hold the latter in operative position and means operative to simultaneously withdraw said bolts so as to release said holder.

3. A work holding attachment for milling machines and the like comprising in combination a base adapted to be secured to the bed of the machine, a rotary work holder mounted on a horizontal axis on said base and provided with a plurality of work holding means, a pair of slidable bolts on opposite sides of said base and adapted to enter corresponding recesses in said holder to hold the latter in operative position, and a toggle for simultaneously withdrawing said bolts from said recesses to release said holder.

4. A work holding attachment for milling machines and the like comprising in combination a base adapted to be secured to the bed of the machine, a rotary work holder mounted on a horizontal axis on said base and provided with a plurality of work holding means, a pair of slidable bolts on opposite sides of said base and adapted to enter corresponding recesses in said holder to hold the latter in operative position, a toggle, for simultaneously withdrawing said bolts from said recesses to release said holder, and a spring on said toggle for causing said bolts to enter a pair of recesses when said toggle is released.

5. A device of the class described comprising in combination a base having opposite side members, a work holder mounted between said side members to swing vertically, a pair of oppositely arranged slidable bolts in said side members adapted to enter corresponding recesses in said work holder for holding the latter in operative position, levers pivoted to said base and connected with said bolts, and toggle arms between said levers adapted to spread the latter to withdraw said bolts from said recesses.

6. A device of the class described comprising in combination a base having opposite side members, a work holder mounted between said side members to swing vertically, a pair of oppositely arranged slidable bolts in said side members adapted to enter corresponding recesses in said work holder for holding the latter in operative position, levers pivoted to said base and connected with said bolts, toggle arms between said levers adapted to spread the latter and to withdraw said bolts from said recesses and a spring between said levers for drawing said levers together when the toggle joint is broken and to force said bolts into a pair of recesses.

7. A device of the class described comprising in combination a base having opposite side members, a work holder mounted between said side members to swing vertically, a pair of oppositely arranged slidable bolts in said side members adapted to enter corresponding recesses in said work holder for holding the latter in operative position, the recesses in said work holder being provided with hard metal bushings, and means for simultaneously sliding said bolts into and out of said recesses.

8. A device of the class described comprising in combination a base having opposite side members, a work holder mounted between said side members to swing vertically, a pair of oppositely arranged slidable bolts in said side members adapted to enter corresponding recesses in said work holder for holding the latter in operative position, hard metal bushings in said side members and in said recesses for said bolts, and means for simultaneously sliding said bolts into and out of said recesses.

9. An attachment for milling machines or the like comprising in combination a base having opposite side members, a flat work holder mounted between said side members to rotate vertically, said work holder being provided with means near its ends for holding jigs for positioning the pieces of work, plates bolted to said work holder for clamping the work in place, and springs on said bolts for forcing said plate outwardly when said bolts are unscrewed, and means for releasably holding said work holder in position during operation on a piece of work.

10. An attachment for milling machines or the like comprising in combination a base having opposite side members, a flat work holder mounted between said side members to rotate vertically, said work holder being provided with means near its opposite ends for holding a pair of pieces of work for successive presentation to the milling cutter, said holder being provided with oppositely disposed recesses near its ends, slidable bolts in said side members and adapted to enter said recesses to hold a piece of work in operative relation to the milling cutter, and means for simultaneously withdrawing said bolts from said recesses so as to rotate said holder to present the opposite piece of work to the milling cutter.

In testimony whereof, I affix my signature.

ARTHUR S. HOLMES.